United States Patent Office 3,247,669
Patented Apr. 26, 1966

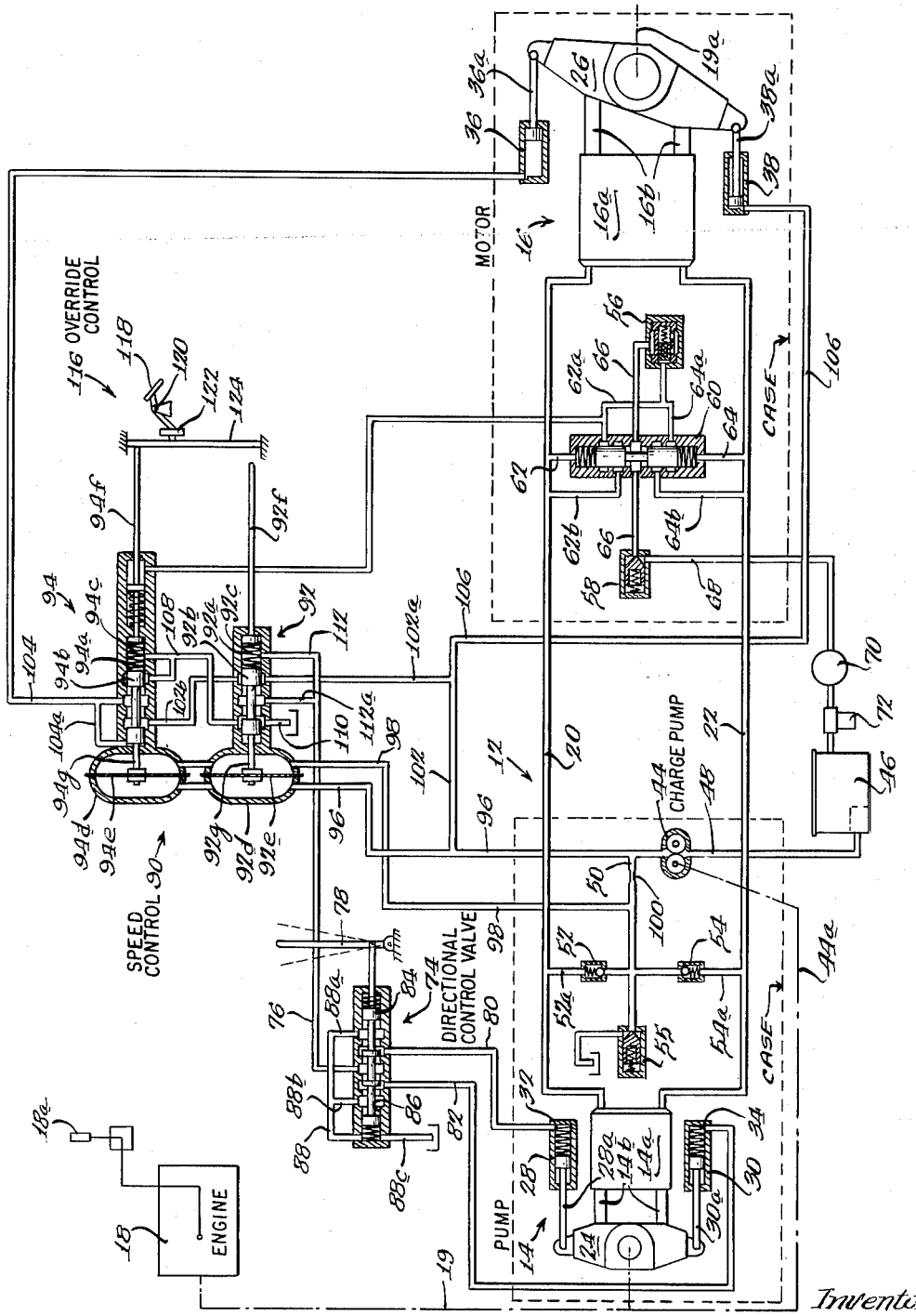

3,247,669
HYDROSTATIC TRANSMISSION
Melvin M. Hann, Rockford, Ill., assignor to Sundstrand Corporation, a corporation of Illinois
Filed Apr. 23, 1964, Ser. No. 361,934
13 Claims. (Cl. 60—53)

This invention relates to hydrostatic transmissions and more particularly to a new and improved control means therefor.

Hydrostatic transmissions are particularly suitable for propelling slow moving, hard working vehicles such as lift trucks which have auxiliary components thereon for performing work. With such vehicles it is desirable that the torque from the prime mover or engine thereof be suitably transmitted to the wheels or tracks of the vehicle for imparting movement to the vehicle as well as operating the functional component of the vehicle. If the transmission is set for a certain speed of movement for the vehicle and an auxiliary work component of the vehicle is in operation, stalling may result due to difficult terrain encountered by the vehicle or overloading resultant from the work component of the vehicle. Thus, it is desirable for such transmissions to include means for supplying an efficient transfer of power to the vehicle driving system through a wide range of engine speeds within a suitable range of vehicle speeds, while maintaining the engine at a sufficient r.p.m. for operating the vehcile through difficult terrain or strenuous work functions which may be encountered thereby.

It is a general object of this invention to provide a new and improved control means for a hydrostatic transmission.

It is a primary object of this invention to provide a new and improved control means for a hydrostatic transmission which possesses the advantages mentioned above.

Another object is to provide in a hydrostatic transmission with a variable displacement pump and motor a new and improved control means for staging the pump and motor in response to the speed of a prime mover driving the pump.

A more specific object is to provide a new and improved control of the type described for an engine driven transmission including an engine driven charge pump, said control comprising means for sensing the rate of fluid flow from the charge pump as an indication of engine speed, together with means responsive to the sensing means for automatically adjusting the pump and motor displacement varying means in predetermined sequence to bring the transmission up to speed as the engine attains speed.

A further object is to provide a new and improved control of the character mentioned including means responsive to engine speed for controlling the displacement of the motor to vary the load on the engine and thereby prevent engine stalling.

It is also an object of this invention to provide in a hydrostatic transmission of the type described a manually or pedally operable braking or inching control for overriding a primary transmission control by which the transmission output is normally controlled.

Other objects, features and advantages of the present invention will be apparent from the following description of the preferred embodiment illustrated in the accompanying drawings, in which:

The single figure is a diagrammatic illustration of a preferred embodiment of the transmission of this invention.

Referring now to the drawings, in the figure there is shown a hydrostatic transmission having a closed hydraulic circuit 12 with an engine driven pump 14 and a motor 16 supplied by the pump. Preferably, both the pump and motor are of an axial piston type having a rotatable cylinder block 14a and 16a, respectively, each with a plurality of cylinders in annular array and reciprocal pistons 14b and 16b, respectively. The pump is driven by an engine diagrammatically illustrated at 18 through a suitable means diagrammatically illustrated at 19. The engine has a throttle control 18a. In turn, the output of the transmission is applied to an output shaft schematically illustrated at 19a for appropriately propelling the vehicle as well as operating the functional components thereof. The closed circuit 12 consists of conduits 20 and 22 which carry the pumped fluid from the pump to the motor and return the same from the motor to the pump.

The pump has a variable and reversible swashplate 24 which is engaged by the pistons 14b and the motor has a variable angle motor swashplate 26 which is engaged by the pistons 16b. The combination of the reversible variable pump swashplate and variable motor swashplate gives the transmission an extreme flexibility so that it is capable of operating the vehicle in either direction over a great range of torque within a given range of speed thereby permitting an infinite number of output combinations.

Operatively associated with the pump swashplate are pump control cylinders 28 and 30 which are connected to the swashplate by rods 28a and 30a for positioning the swashplate in response to actuation of the cylinders. Each pump control cylinder is provided with a spring 32 and 34 to normally position the pump swashplate in an upright position of minimum displacement as shown in the figure.

Operatively associated with the motor swashplate by means of rods 36a and 38a are motor control cylinders 36 and 38. Preferably, one of the motor control cylinders, such as 36, is larger than the other.

The transmission includes a positive displacement gear type replenishing and cooling pump 44 which is also driven by the engine 18 as represented at 44a. The replenishing and cooling pump is in communication with a reservoir 46 through a supply conduit 48 for supplying replenishing and cooling fluid to the system, as well as control fluid, by means of the charge conduit 50. A pair of spring biased check valves 52 and 54 are provided and are in communication with the charge conduit 50 and with each of the conduits 20 and 22 of the circuit by means of the conduits 52a and 54a, respectively, for supplying replacement fluid to the low pressure side of the circuit. A spring biased make-up relief valve 55, which is also in communication with the charge conduit 50, is provided for removing the excess fluid pumped by the pump 44.

The transmission is further provided with an overpressure relief valve 56, a low pressure relief valve 58 and a double acting shuttle valve 60. The overpressure relief valve serves the function of preventing abnormally high pressure in either of the two main hydraulic lines by relieving the circuit of surge pressure which may occur during rapid acceleration or abrupt braking. The low pressure relief valve provides a means for removing heated oil replaced by cooling oil supplied by the replenishing pump.

The double acting shuttle valve 60 is in communication with the conduits 20 and 22 by means of the shuttle valve conduits 62 and 64. The conduits 62 and 64 conduct the fluid from the high pressure side of the circuit to the valve to appropriately position the valve stem so that communication will be established with the overpressure relief valve by either of the overpressure relief conduits 62a or 64a so that the high pressure fluid may flow directly thereto. The action of the high pressure fluid in so positioning the valve will cause heated fluid entering from the low pressure side through either conduit 62b or 64b to pass through a drain conduit 66 into the low pressure relief valve 58 along with any high pressure fluid from the overpressure relief valve. At this point the fluid passes through a drain conduit 68, through heat exchanger 70, filter 72 and into the reservoir 46. The shuttle valve is spring centered to a closed position so that during the transition of reversing the transmission and thereby reversing the pressure in the lines 20 and 22 none of the high pressure oil is lost from the circuit. As previously mentioned, when the transmission is in neutral, the make-up relief valve 55 will perform the function of removing the excess oil from the circuit.

For activating the pump control cylinders to appropriately position the pump swashplate so that the vehicle may be moved in the desired direction there is provided a four-way spring centered directional control valve 74. The directional valve receives control fluid from a directional control valve supply conduit 76. Appropriate actuation of a directional control valve handle 78 will supply control fluid through one of conduits 80 or 82 to the pump control cylinder 28 or 30, to appropriately position the pump swashplate to pump in the desired direction. The directional control valve is provided with a valve stem 84 laterally movable in a valve bore 86 in response to the movement of the handle 78. When the control valve is in a position of neutral, as shown in the figure, the control cylinder conduits 80 and 82 are in communication with a drain conduit 88 by means of intermediate conduits 88a and 88b through which control fluid, which may be in the control cylinders, is fed to drain through the conduit 88c.

Further included in this transmission is a means 90 for controlling the transmission speed. Included in the means 90 are a pump control valve 92 and a motor control valve 94. The two valves are similar and each has a valve bore 92a or 94a with a laterally movable valve stem 92b or 94b therein. Each valve is provided with a biasing spring 92c or 94c for normally urging the valve stem to the left as shown in the figure. Associated with each valve is a diaphragm chamber 92d or 94d having a diaphragm 92e or 94e therein, each having an attached stem 92g or 94g engaging the associated valve stem to maintain the valve stem in the position shown in opposition to the biasing spring so that the valve stems are normally positioned as shown.

By means of separate conduits 96 and 98 communication is established between opposite sides of a restrictive orifice 100 in conduit 50 and opposite sides of each of the diaphragms 92e and 94e in the chambers 92d and 94d, respectively. As fluid is delivered by the pump 44 out the conduit 50 there will be pressure drop across the restrictive orifice 100 which will be proportional to the speed of the engine 18 which drives the pump 14 as well as the auxiliary pump 44. By conducting the fluid from opposite sides of the orifice to opposite sides of the aforementioned diaphragms, this pressure drop can be sensed thereby and appropriately utilized in the valves 92 and 94.

Control fluid is supplied to the pump and motor valves 92 and 94 through conduits 102, 102a and 102b. When the transmission is at rest, as shown in the figure, control fluid passes by means of conduit 102a around the valve stem 92b in the annular groove in the pump valve bore and out the conduit 102b to the motor control valve 94. From there it passes around the reduced portion of the motor control valve stem 94b and exits in conduit 104 where it is supplied to the motor control cylinder 36. The motor control cylinder 38 is always provided with a constant supply of control fluid by means of the conduit 106. Since the motor control cylinder 36 is of a larger dimension than the control cylinder 38, when both are supplied with control fluid the motor control cylinder 36 will overcome the motor control cylinder 38 and the rod 36a will cause the motor swashplate to tilt, as shown in the figure, so that upon actuation of the transmission, the motor is in a position of maximum displacement for maximum torque and minimum speed.

For providing a comunication between the motor control valve and drain, there is a motor control drain conduit 108 which leads therefrom to the pump control valve, and by means of an annular groove in the valve housing, is in communication with the drain conduit 110. Thus when the motor control valve is appropriately positioned for drain, the fluid may be drained therefrom and back to the reservoir.

The pump control valve supplies control fluid to the directional control valve by means of the conduit 112a, which is in communication with the conduit 76. Thus when the pump control valve is appropriately positioned, the control fluid will be supplied to the directional control valve in proportionate amounts dependent upon the movement of the pump control valve stem 92b.

In operation, when the engine is activated and the engine is driving the pump 14 and the control pump 44, the pressure drop across the orifice 100 will be sensed on either side of the diaphragms 92e and 94e. The high pressure supply coming from the conduit 96 will be on the left side of the diaphragms, as shown in the figure, and the low pressure coming from the conduit 98 will be on the right side of the diaphragms. Therefore, as the difference in pressure is increased, the diaphragms will be caused to move farther to the right in opposition to the centering springs. This will move the pump control valve stem 92b to the right permitting control fluid to pass by the reduced portion of the valve stem and out of the conduit 112a to the directional control valve. As the valve handle 78 is appropriately moved to position the valve stem 84, control fluid from the conduit 76 will be permitted to pass out into the conduit 80 or 82, depending upon the direction of the movement of the valve stem, and therefore be supplied to either the control cylinder 28 or 30 for moving one of the rods 28a or 30a to appropriately incline the pump swashplate depending on the desired direction of movement. Thus the pump 14 will begin to supply fluid to the motor, where the swashplate is in a position of maximum torque and minimum speed as the vehicle begins movement.

As engine speed is increased, the force of pumped fluid acting on the diaphragms 92e and 94e will become greater than the opposition of the centering springs, causing the valve stems 92b and 94b to be moved to the right. In the motor valve 94 this will have the effect of shutting off the supply of control fluid to the motor control cylinder 36 through the conduit 102b and opening the drain conduit 108. As fluid drains from the motor control cylinder 36, the motor control cylinder 38, which has a constant supply of control fluid, will begin to act in opposition to cylinder 36 and the rod 38a will begin to bring the motor swashplate toward upright position moving toward minimum displacement and maximum speed.

In operation, the directional valve 74 is first moved in a direction to obtain the desired direction of movement. Then the engine speed is increased. The spring 92c in the pump control valve 92 is weaker than the spring 94c in the motor control valve 94 so that as the pressure builds up ahead of orifice 100, proportionately with the increase in engine speed, the pump control valve stem is shifted first, thereby putting the pump 14 into stroke. The motor control valve spring, being stronger, thereafter yields to move the motor swashplate toward a minimum stroke position, thereby increasing vehicle speed.

As the pump valve stem 92b moves toward the right, to pass fluid from the line 102a to the conduit 76, and the appropriate pump control cylinder is pressurized, pressure also rises in the passage 112 leading to the right end of the valve stem 92b, providing a feedback signal acting together with the spring 92c to counterbalance the pressure acting against the left end of the valve stem through the diaphragm 92e. In the motor control valve, as the valve stem 94b moves to the right, the flow of charge fluid through the passage 102b is reduced and the passage 104 communicates with the tank passage 108. The left end of the valve stem, originally exposed to charge pressure becomes connected to the tank along with the control cylinder 36, thereby providing a feedback signal acting in conjunction with the spring 94c which counterbalances the force against the left end of the stem through the diaphragm 94e. The valves thus in effect are maintained in metering positions, though there may be some rapid dithering.

When the vehicle is in motion, if an increased load is encountered, slowing the engine, there will be a pressure drop ahead of orifice 100, allowing return of the motor control valve stem 94b, to increase torque and decrease speed at the motor output shaft, in an effort to overcome the increased load. If the load is overcome and engine speed is attained again, the pressure ahead of orifice 100 again causes movement of the motor swashplate toward minimum stroke. If the load is not overcome, ultimately the pump swashplate may be moved toward minimum stroke, possibly until the transmission is stalled, but without stalling the engine. Then, the load may be overcome in some instances by increasing engine speed.

The valve stems 92b and 94b cooperate respectively with plungers 92f and 94f which oppose spring 92c and 94c respectively and project outwardly from the valves and toward abutting relationship with an override means 116. The override means 116 includes an actuation pedal 118 pivotally mounted at 120 and associated with a linkage 122 for moving an override bar 124 against the override plungers in opposition to the movement imparted thereto by the pressure responsive diaphragms and biasing. Movement of the stems in the opposite direction first increases the flow of control fluid to motor control cylinder 36 and then decreases the flow of fluid to the directional control valve 74 and thereby positions the motor toward maximum displacement and the pump toward minimum displacement. If it is desired to reduce the transmission speed for a given engine speed to brake the vehicle or to "inch" the vehicle along in close quarters, the override means may then be activated to accomplish this result. Note that the override plungers are arranged so that motor plunger 94f is first engaged to compress spring 94c to first increase the angle of motor swashplate 26 to reduce speed and thereafter the pump plunger 92f is actuated to compress spring 92c to reduce pump displacement.

I claim:
1. In a hydrostatic transmission, in combination, a pump having an inlet and an outlet, a motor having an inlet and an outlet, conduit means connecting the pump outlet with the motor inlet and the motor outlet with the pump inlet, means for varying the displacement of the pump, means for varying the displacement of the motor, an engine for driving the pump, means for varying the speed of the engine, a charge pump driven by said engine and having an outlet, and means for controlling transmission speed including a restrictive orifice in the charge pump outlet providing a pressure drop proportionate to engine speed and fluid operable means for sensing the pressure drop across the orifice and controlling the displacement varying means in response to increasing engine speed to vary the displacement of the pump from neutral toward maximum and vary the displacement of the motor from maximum toward minimum thereby to bring the transmission up to speed as the engine attains speed.

2. A combination as in claim 1, wherein each of said displacement varying means comprises a fluid operable device, and said sensing and controlling means comprises valve means controlling said fluid operable devices and fluid operable motor means responsive to said pressure drop and controlling said valve means.

3. A combination as in claim 2, wherein said valve means comprises separate valves respectively controlling the fluid operable displacement varying means, and wherein said fluid operable motor means comprises separate diaphragm motors respectively controlling said valve means, and including relatively strong and relatively weak spring means respectively biasing the motor valve and pump valve in opposition to said diaphragm motors so that the pump valve responds first and the motor valve responds second on increasing engine speed.

4. A combination as in claim 3, wherein the diaphragm motors each comprises a diaphragm with separate chambers on opposite sides of the diapragm respectively communicating with the charge pump outlet on opposite sides of said orifice.

5. A combination as in claim 2, wherein the main pump and main motor are axial pistion devices and the means for varying displacement in each includes a variable angle swash-plate controlled by the associated fluid operable device.

6. A combination as in claim 1, including manually operable means for overriding the said controlling means to increase motor displacement for braking the transmission.

7. A combination as in claim 1, including manually operable means for overriding said fluid operable means to increase motor displacement and then reduce pump displacement for braking or "inching" the transmission.

8. In a hydrostatic transmission, in combination, a pump having an outlet, a motor having an inlet, conduit means connecting the pump outlet with the motor inlet, means for varying the displacement of the pump and the motor, an engine for driving the pump, means for supplying control fluid under pressure proportional to engine speed, and means for controlling the displacement varying means to bring the transmission up to speed, and means for sensing the pressure of said control fluid and controlling the displacement varying means to increase motor displacement as the engine speed decreases due to increased load.

9. In a hydrostatic transmission, in combination, a pump having an inlet and an outlet, a motor having an inlet and an outlet, conduit means connecting the pump outlet with the motor inlet and the motor outlet with the pump inlet, means for varying the displacement of the pump, means for varying the displacement of the motor, an engine for driving the pump, a charge pump driven by said engine and having an outlet, and means for controlling transmission speed including a restrictive orifice in the charge pump outlet providing a pressure drop proportionate to engine speed and fluid operable means for sensing the pressure drop across the orifice for controlling the displacement varying means to increase motor displacement in response to a drop in engine speed due to increased load thereon.

10. A combination as in claim 9, wherein each of said displacement varying means comprises a fluid operable device, and said sensing and controlling means comprises valve means controlling said fluid operable devices and fluid operable motor means responsive to said pressure drop and controlling said valve means.

11. A combination as in claim 9, wherein said valve means comprises separate valves respectively controlling the fluid operable displacement varying means, and wherein said fluid operable motor means comprises separate diaphragm motors respectively controlling said valve means, and including relatively strong and relatively weak spring means respectively biasing the motor valve and pump valve in opposition to said diaphragm motors so that the motor valve responds first and the pump valve responds second on decrease in engine speed.

12. In a hydrostatic transmission, in combination, a pump having an inlet and an outlet, a motor having an inlet and an outlet, conduit means connecting the pump outlet with the motor inlet and the motor outlet with the pump inlet, fluid operable means for varying the displacement of the pump, fluid operable means for varying the displacement of the motor, a prime mover connected for driving the pump, manual control means for varying the speed of the prime mover; and means responsive to prime mover speed for controlling the displacement of the pump and the motor including a charge pump driven by said prime mover, a slidable pump control valve adapted to port fluid from said charge pump to said pump fluid operable means, a slidable motor control valve adapted to port fluid from said charge pump to said motor fluid operable means and from said motor fluid operable means to a tank, means for sensing the flow from said charge pump and for moving both of said valves in response thereto to increase the displacement of the pump and decrease the displacement of the motor as the prime mover speed increases, and means for providing feedback signals to said valves respectively indicative of the displacement of said pump and motor assisting return of the valves to a neutral position and thereby stop movement of the fluid operable means when the desired pump and motor displacements are obtained corresponding to the prime mover speed selected by the manual control means.

13. In a hydrostatic transmission, in combination, a pump having an inlet and an outlet, a motor having an inlet and an outlet, conduit means connecting the pump outlet with the motor inlet and the motor outlet with the pump inlet, fluid operable means for varying the displacement of the pump on both sides of neutral, a manually operable direction control valve for porting fluid to said fluid operable means to reverse the pump, fluid operable means for varying the displacement of the motor, a prime mover connected to drive the pump, manual control means for varying the speed of the prime mover; means responsive to prime mover speed for controlling the displacement varying means of the pump and the motor including a charge pump driven by said prime mover, a slidable pump control valve adapted to port fluid from said charge pump to said directional control valve, a slidable motor control valve for porting fluid selectively from said charge pump to said motor fluid operable means and from said motor fluid operable means to a tank, a diaphragm motor connected to one end of each of the slidable control valves to initially position each valve, a restrictive orifice in the outlet of said charge pump, passage means connecting each side of the orifice to the opposite sides of each of the diaphragm motors whereby the slidable valves are subjected to a force proportional to flow from the charge pump, a spring urging the other end of each of said slidable valves in opposition to said diaphragm motors, the spring associated with the motor control valve being stronger than the pump valve spring whereby the pump displacement will increase during a lower portion of the speed range of the prime mover and the motor displacement will decrease in the upper portion of the speed range as the prime mover comes up to speed, and feedback means for providing feedback signals to the slidable control valves respectively indicative of the displacement of the pump and the motor assisting return of the valves to a neutral position to thereby stop movement of the fluid operable means when the pump and motor have reached the desired displacement corresponding to the prime mover speed; and manual override means for increasing the displacement of the motor and decreasing the displacement of the pump to reduce the output speed of the transmission including a manual control lever, plungers engaging each of said springs to urge the valves in opposition to the diaphragm motors, and means connecting the control lever to move the plungers whereby actuation of said control lever will move the slidable control valves to a position where fluid is ported to the fluid operable means to decrease transmission output speed.

References Cited by the Examiner
UNITED STATES PATENTS

| | | | |
|---|---|---|---|
| 2,255,783 | 9/1941 | Kendrick | 60—53 |
| 3,053,044 | 9/1962 | Gresty | 60—19 |
| 3,054,263 | 9/1962 | Budzich et al. | 60—53 |
| 3,167,907 | 2/1965 | Kempson | 60—53 X |

EDGAR W. GEOGHEGAN, *Primary Examiner.*